United States Patent [19]

Pagliarini, Jr.

[11] Patent Number: 5,036,177
[45] Date of Patent: Jul. 30, 1991

[54] METHOD FOR REDUCING HAZARDS DUE TO LOW FREQUENCY ELECTRIC AND MAGNETIC FIELDS

[76] Inventor: John A. Pagliarini, Jr., P.O. Box 2458, Ocean Bluff, Mass. 02065

[21] Appl. No.: 525,087

[22] Filed: May 16, 1990

[51] Int. Cl.[5] .............................................. H05B 3/34
[52] U.S. Cl. ..................................... 219/212; 219/528
[58] Field of Search ............... 219/212, 528, 529, 549; 338/61, 62, 63

[56] References Cited

U.S. PATENT DOCUMENTS

| | | | |
|---|---|---|---|
| 2,520,851 | 8/1950 | Myers | 219/212 |
| 2,522,753 | 9/1950 | Drobisch | 219/212 |
| 3,270,184 | 8/1966 | Negromanti | 219/501 |
| 3,373,262 | 3/1968 | Howell | 219/501 |
| 3,683,151 | 8/1972 | Mills | 219/212 |
| 3,739,142 | 6/1973 | Johns | 219/212 |
| 4,433,368 | 2/1984 | Choi | 363/45 |

FOREIGN PATENT DOCUMENTS 2148633  5/1985  United Kingdom ............... 219/212

OTHER PUBLICATIONS

Carnegie-Mellon Univ., "Strategies to Reduce Population Exposure . . . ", Dec. 1984.
Stevens, William K., "Scientists Debate Health Hazards . . .", N.Y. Times, Jul. 11, 1989.
"Are Electric Blankets Safe?", Consumer Reports, Nov. 1989.
Holt, Charles A., Electronic Circuits, pp. 812–815, ©1978.

Primary Examiner—Teresa J. Walberg
Attorney, Agent, or Firm—Allan J. Jacobson

[57] ABSTRACT

A method and apparatus for reducing the low frequency electric and magnetic fields associated with electric blankets and mattress pads includes a power form converter inserted between the heating element of the electric blanket or mattress pad and the AC power source. In one embodiment, the power form converter is an AC to DC converter. In another embodiment, the power form converter is a full wave bridge rectifier circuit. The power form converter may either be built into the electric blanket or mattress pad, or may be external so that an existing electric blanket or mattress pad may be used in conjunction with the power form converter.

3 Claims, 2 Drawing Sheets

METHOD FOR REDUCING HAZARDS DUE TO LOW FREQUENCY ELECTRIC AND MAGNETIC FIELDS

FIELD OF THE INVENTION

This invention relates to a method and apparatus for reducing the hazards due to low frequency fields. In particular, this invention relates to a method and apparatus for reducing the 60 Hz electric and magnetic fields associated with electric blankets and mattress pads.

BACKGROUND OF THE INVENTION

Low frequency electric and magnetic fields are produced as a consequence of alternating current (AC) power distribution. AC power produces forward and reverse currents at a rate of 60 times per second (60 Hertz). The alternating current results in expanding and contracting electric and magnetic fields at a 60 Hertz (Hz) rate.

Recent studies have indicated that 60 Hz electric and magnetic fields may be associated with childhood cancer. In particular, in two recent studies, an association between childhood cancer and proximity to 60 Hz power distribution equipment has been suggested. However, other studies have indicated no significant relationship between childhood cancer and 60 Hz electric and magnetic fields.

In addition to proximity to 60 Hz power distribution equipment, concern has been raised about the particular health risks posed by electric blankets and mattress pads. Although all electric appliances have associated electric and magnetic fields, electric blankets and mattress pad products are different because of their prolonged use in close proximity with the body.

For example, a toaster or hair dryer is used for several minutes, and at a distance of several feet from the body. On the other hand, an electric blanket or mattress pad is used for seven or eight hours and is generally in close contact with a large portion of the body. One recent study estimated that the typical use of an electric blanket or mattress pad nearly doubles a person's magnetic field exposure and increases the electric field exposure by about one third.

In view of the uncertainty regarding the health risks associated with 60 Hz electric and magnetic fields, medical experts have recommended that children and pregnant women avoid electric blankets and mattress pads altogether.

SUMMARY OF THE INVENTION

The present invention is embodied in a method and apparatus for reducing or eliminating the low frequency electric and magnetic fields associated with electric blankets and mattress pads. As used herein, the term "electric blankets" is to be regarded as also including electric mattress pads and other similar appliances within its meaning.

Specifically, the present invention includes a power form converter, connected between the electric blanket and the 60 Hz AC power source. In one embodiment, the power form converter converts the 60 Hz AC input to a direct current (DC) output. Since the output current from the power form converter is DC, and therefore the current in the heating element of electric blanket is DC, instead of an alternating electric and magnetic fields, only static electric and magnetic fields are thereby generated. No health hazard has been associated with static electric and magnetic fields. Also, the resulting static electric and magnetic fields produced by the electric blanket powered by DC power is considerably smaller than other static electric and magnetic fields in the environment. For example, the earth's magnetic field would be considerably stronger than the static magnetic field produced by the electric blanket.

In another embodiment, the power form converter is a full wave bridge rectifier which converts pure 60 Hz AC to full wave rectified AC. Full wave rectified AC contains a half amplitude 120 Hz AC component plus a DC component. In the latter embodiment, the magnitude of the alternating electric and magnetic fields associated with the electric blanket is reduced, while at the same time, the frequency of the associated alternating electric and magnetic fields is increased. Since there is evidence that higher frequency electric and magnetic fields do not have the risk that is associated with a 60 Hz electric or magnetic field, the health risk is thereby reduced.

The power form converter may be a separate unit so that an existing electric blanket can be plugged into the power form converter, and the power form converter in turn plugged into a standard 60 Hz AC electric outlet. Thus, existing electric blankets can be retrofitted for safer use. Alternatively, in another embodiment, the power form converter may be integrated into a single unit with an electric blanket at the time of manufacture.

DETAILED DESCRIPTION

Figure 1:
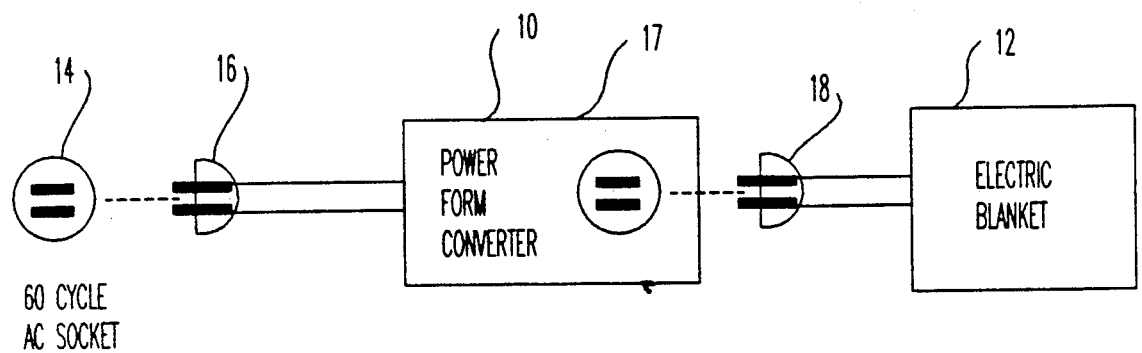
FIG. 1 is a wiring diagram, partially in block form, illustrating an embodiment of the present invention for use in conjunction with an existing electric blanket.

In reference to FIG. 1, the present invention includes a power form converter 10 having an AC input power plug 10, and an output power socket 17. The AC power plug 18 of an existing electric blanket 12 is connected to power socket 17, and AC input power plug 16 is connected to a standard 60 Hz AC power socket 14. In operation, the power form converter 10 functions to convert the 60 Hz AC power input from power socket 14 into a form in which the 60 Hz AC power component is reduced or eliminated. The resulting changed power form is delivered to electric blanket 12 through its regular power plug 18. Since the power form delivered to the electric blanket 12 has a much reduced 60 Hz AC component, the health risk associated with electric blanket 12 is thereby reduced.

Figure 2:
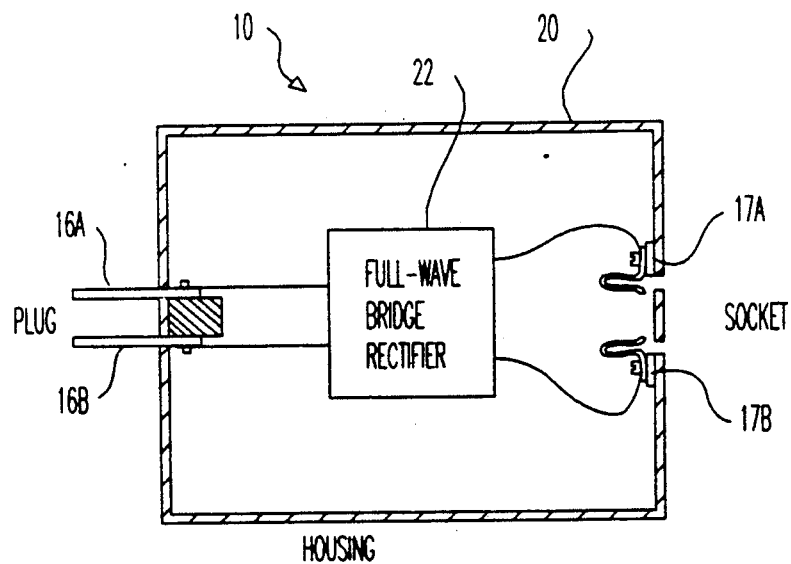
FIG. 2 is a mechanical assembly diagram of one embodiment of a power form converter for use in conjunction with the present invention.

One embodiment of a power form converter 12 is shown in the mechanical assembly drawing of FIG. 2. The power form converter 10 includes prongs 16a and 16b which form the AC input power plug 16, a full wave rectifier bridge 22, and contacts 17a and 17b which form output power socket 17. All of the components are mounted in a housing 20. For use in operation with an existing electric blanket, power plug 16 is directly inserted into a standard 60 Hz AC wall power socket which provides mechanical support for the entire housing 20. The electric blanket is then plugged into power socket 17.

Figure 3:
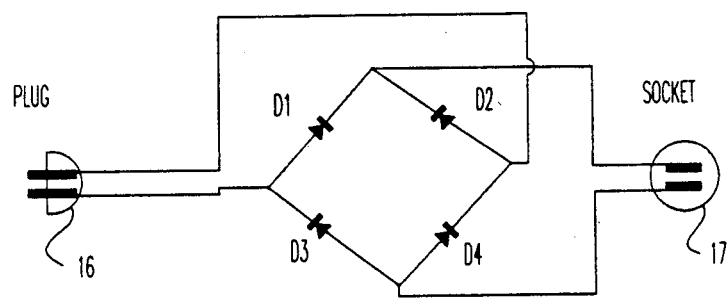
FIG. 3 is a schematic diagram of the power form converter of FIG. 2 for use in conjunction with the present invention.

A schematic diagram of the power form converter of FIG. 2 was shown in FIG. 3. Diodes D1, D2, D3 and D4, are connected in a full wave bridge rectifier arrangement, well known to those skilled in the art. The input terminals to the full wave bridge rectifier are coupled to power plug 7, and the output terminals from the full wave bridge rectifier are coupled to power socket 17. In operation, the full wave bridge rectifier D1, D2, D3, D4 converts the 60 Hz AC input from power plug 16 into a 120 Hz full wave rectified power form at output power socket 17. The 120 Hz full wave rectified power form at output power socket 17 has twice the frequency of the input 60 Hz power form, as well as a generally reduced AC component.

Figure 4:
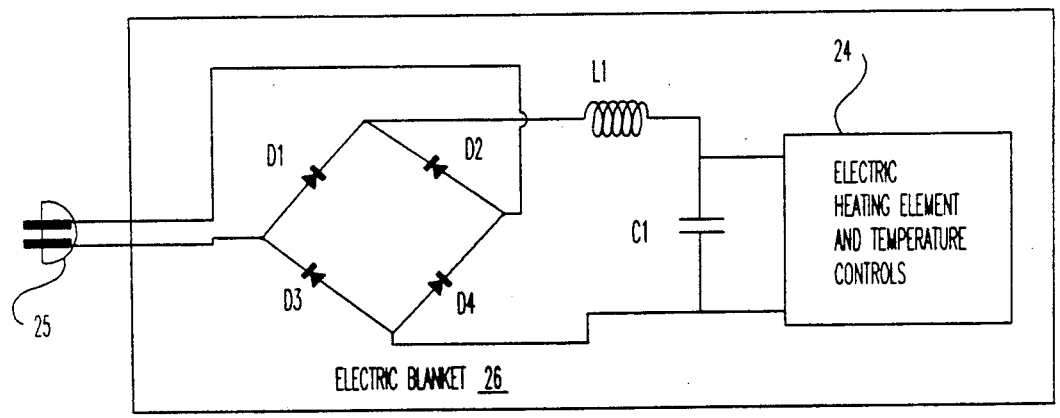
FIG. 4 is a schematic diagram partially in block form, of an electric blanket in accordance one embodiment of the present invention.

Another embodiment of the present invention is shown in FIG. 4, in which the power form converter is an AC to DC power supply. An integrated electric blanket 26, comprises an input power plug 25, a full wave bridge rectifier circuit comprising diodes D1, D2, D3 and D4, followed by a low pass filter circuit comprising inductor L1 and capacitor C1. The full wave bridge rectifier circuit D1, D2, D3, D4 and the low pass filter circuit L1, C1 comprise an AC to DC power supply well known to those skilled in the art. The output of the filter circuit L1, C1 is connected to the heating and temperature controls 24 within the electric blanket 26.

In operation, the AC power form from input power plug 25 is converted to a DC power output form at the output filter L1 and C1. Thus, the power to the electric heating element and temperature controls 24 of electric blanket 26 is essentially DC, thereby eliminating the 60 Hz electric and magnetic fields associated with the electric blanket.

Other types of power form converters will be apparent to those skilled in the art which may be used in conjunction with the present invention so long as such power form converters reduce the amount of 60 Hz AC power at the output thereof. Such alternative power form converters may either be integrated into an electric blanket or be provided as a free-standing unit to retrofit existing electric blankets in order to reduce a 60 Hz electric and magnetic fields associated therewith.

What is claimed is:

1. A method for reducing the 60 Hz electric and magnetic fields associated with an AC electric blanket wherein said AC electric blanket has an input power plug originally intended for connection to an AC power source, and has a power supply control circuit coupled to said input power plug for providing controlled AC power to the heating element thereof, said method comprising the steps of:

disconnecting said input power plug of said AC electric blanket from said AC power source;

converting said 60 Hz AC power form from said AC power source to a second power form, said second power form having a reduced component of 60 Hz AC power; and applying said second power form to said input power plug of said AC electric blanket.

2. A method in accordance with claim 1 wherein said step of converting said 60 Hz AC power form into a second power form comprises the step of converting AC to DC.

3. A method in accordance with claim 1 wherein said step of converting said 60 Hz AC power form into a second power form comprises the step of full wave rectifying said 60 Hz AC power form.

* * * * *